United States Patent [19]

Krutchen

[11] 4,420,448
[45] Dec. 13, 1983

[54] POLYMER FOAM PROCESS

[75] Inventor: Charles M. Krutchen, Pittsford, N.Y.

[73] Assignee: Mobil Oil Corporation, New York, N.Y.

[21] Appl. No.: 412,044

[22] Filed: Aug. 26, 1982

[51] Int. Cl.³ .............................................. B29D 27/00
[52] U.S. Cl. ..................................... 264/53; 264/321; 264/DIG. 15; 425/72 R; 425/817 C
[58] Field of Search ................. 264/53, DIG. 15, 321; 425/72 R, 817 C

[56] References Cited

U.S. PATENT DOCUMENTS 2,774,991  12/1956  McCurdy et al. .......... 264/DIG. 15

Primary Examiner—Philip E. Anderson
Attorney, Agent, or Firm—Alexander J. McKillop; Michael G. Gilman; James P. O'Sullivan, Sr.

[57] ABSTRACT

A method for treating foamed polymer comprising exposing said polymer to an atmosphere of at least substantially carbon dioxide at a temperature sufficient to cause transpiration, absorption and/or dissolution of carbon dioxide into said polymer and decrease the density thereof on subsequent heating.

19 Claims, 1 Drawing Figure

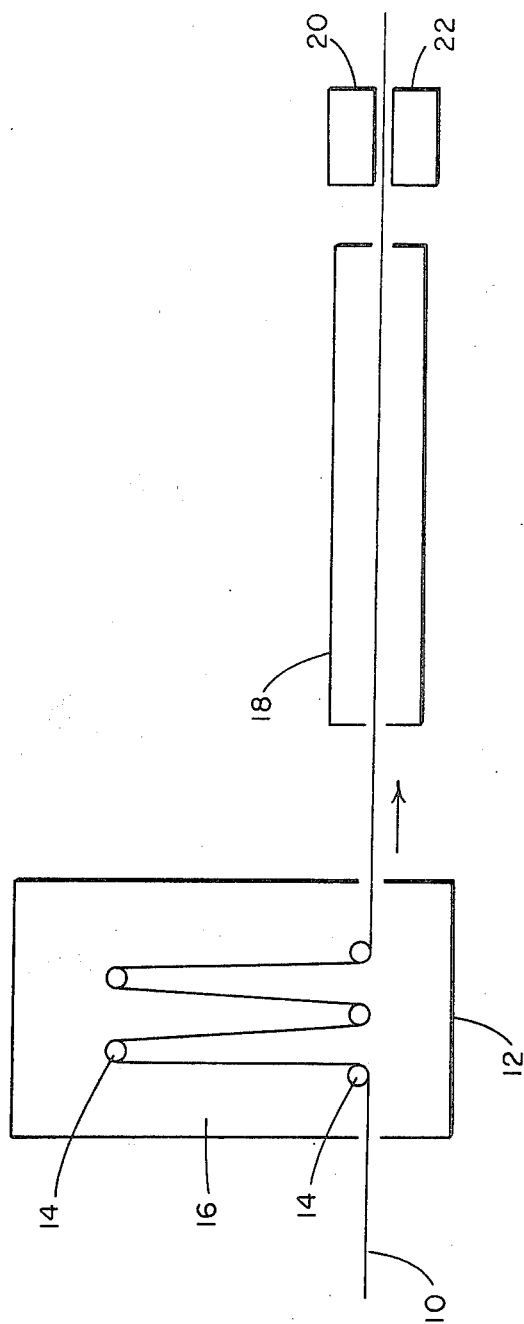

POLYMER FOAM PROCESS

BACKGROUND OF THE INVENTION

This invention relates to the extrusion of foamed polymer compositions and more particularly to a process for rapid aging of a foamed polystyrene.

In the manufacture of polystyrene foam, the method wherein heated and pressurized polystyrene resin is mixed with an appropriate foaming agent and then extruded to a low pressure zone is well-known and widely used. Eventually the foam stock is subjected to a thermoforming step in the manufacture of articles such as foam cups, meat trays, snack food containers, etc. A variety of organic blowing agents have a solvating effect on polystyrene. From the stand point of plasticizing the polystyrene during the melt-mixing of the same, this has beneficial effects in that the melt can be more easily worked and mixed during the stage or stages prior to extrusion thereof. If the solvating effect is too great, deficiencies are encountered during subsequent thermal forming of the polystyrene foam. This is due to the strong affinity of such blowing agents for the polystyrene. Thus, after the foam is extruded, these blowing agents tend to remain in the cell walls of the polystyrene and, even after aging for up to several days, the polystyrene foam will tend to sag or distort prior to or during thermoforming. Therefore, the foam material produced by the above method must be aged carefully, to permit evaporation of the blowing agent down to a specific level, or more importantly to allow dilution with air so that sagging and warping during thermoforming is avoided.

It is an object of the invention to provide a process which permits better control over residual plasticizing-type blowing agent remaining in the foamed polystyrene after extrusion thereof.

It is yet another object of the present invention to provide a process which yields a foamed polymer of comparatively lower density.

It is still another object of the present invention to provide a process which reduces the aging time for a styrene resin prior to thermoforming the same.

SUMMARY OF THE INVENTION

The present invention relates to a process for decreasing the density of a foamed styrene resin comprising:

extruding a combination of molten styrene polymer and a foaming agent from a region of higher pressure to a region of lower pressure to cause foaming of the polystyrene; and transporting the foamed resin through a confined region having an atmosphere of at least substantially carbon dioxide to thereby decrease the density of said foamed resin on subsequent heating above the Tg of said resin as compared with unaged foamed resin.

The present invention also relates to a process for preparing rapidly aged thermoplastic resin foam sheet comprising:

(a) melting a thermoplastic resin;

(b) introducing thereto under pressure, a foaming agent in liquid form, said agent being a member selected from the group consisting of a low molecular weight aliphatic hydrocarbon, a low molecular weight halocarbon and mixtures thereof;

(c) extruding the combination into a lower pressure atmosphere of air to cause foaming of said resin; and (d) transporting said foamed resin through a confined region having an atmosphere of at least substantially carbon dioxide to age said foamed resin at a rate faster than in the absence of the carbon dioxide.

The present invention also relates to a continuous process for preparing a thermoplastic resin foam comprising:

(a) feeding a thermoplastic resin to a screw-extruder and heating the resin to a first temperature above the melting temperature of the resin;

(b) introducing thereto, under pressure, a foaming agent in liquid form while mixing the resin at said first temperature, said foaming agent being a member selected from the group consisting of a low molecular weight aliphatic hydrocarbon, a low molecular weight halocarbon and mixtures thereof;

(c) cooling the mixture of molten resin and blowing agent to a second temperature below the first temperature and above its melting temperature;

(d) extruding a sheet of said resin into a lower pressure atmosphere of air to cause foaming of said resin; and (e) transporting said foamed resin through a confined region having an atmosphere of at least substantially carbon dioxide to cause aging of said foamed resin at least at a rate faster than in the absence of such carbon dioxide.

THE DRAWING

The FIGURE is a longitudinal sectional view of a schematic illustration of the $CO_2$ treatment apparatus employed in the process of the present invention.

DETAILED DESCRIPTION OF THE INVENTION

It is to be understood that the apparatus described herein is merely for purposes of illustrating the present process. Other apparatus, more particularly suited for the preparation of the subject closed cell foamed resins, may be contemplated.

While the process of the present invention is applicable to a wide variety of thermoplastic resins, for illustration purposes it will be described with respect to amorphous linear addition polymers of ethylenically-unsaturated monomers, such as styrene, p-methylstyrene, ethylene or other alpha-olefins, acrylics, etc. The preferred materials are styrenic homopolymers or interpolymers containing a predominant amount of styrene or substituted styrene. Commercially available polystyrene, such as Dow 685, or similar general purpose resins manufactured by Mobil Chemical Company and Foster Grant, can be employed in the subject process.

The process of the present invention will be described in reference to a foamed polymer starting material, such as foamed polystyrene, obtained from any appropriate prior art apparatus or process. For example, the process and apparatus described in U.S. Pat. No. 3,482,006, the disclosure of which is incorporated herein by reference, is particularly preferred. Foamed sheet polystyrene can be prepared generally as described in U.S. Pat. No. 3,482,006 by the following technique employing multiple processing zones.

In a first zone, hereinafter called the feed zone, the polymer charge, e.g., polystyrene, admixed with a cell-size control additive, or nucleation additive, e.g., citric acid and sodium bicarbonate is introduced into an extruder and is carried forward by the action of the extruder screw to a second zone which is the heat plasticizing zone. In this zone as a result of an increase in root diameter of the forwarding screw, the polymer is compacted. Simultaneously, heating fluids, which are circulated through the temperature controlled jacket which surrounds the outside surface of the extruder barrel, raise the temperature of the polymer material to effect thorough melting thereof. Next, the now molten polymer is forwarded to a third zone of the extruder, hereinafter referred to as the injection zone, wherein the blowing agent, e.g., isopentane, is introduced into the extruder utilizing suitable means such as an injection valve. The requisite pressure to achieve introduction of the blowing agent into the molten polymer mass within the injection zone of the extruder need only be sufficiently high to overcome the pressure of the molten polymer at the point of injection into the extruder. The root diameter of the injection zone of the extruder may be either identical to the root diameter of that portion of the screw in the preceding plasticizing zone, or may be somewhat less, depending upon the type of extrusion equipment employed. Also, rather than injecting blowing agent at a single point in the injection zone, it may be injected at a plurality of points within the zone. Following the injection zone, the mixture of molten polymer and liquid blowing agent is advanced by rotation of the forwarding screw to a fourth zone of the extruder, hereinafter referred to as the mixing zone. In the mixing zone, the liquid blowing agent-molten polymer combination, is throughly mixed while being forwarded through the extruder to a fifth zone. In this zone, hereinafter referred to as the cooling zone, the forwarding screw is characterized as having a constant pitch and constant flight diameter. The extruder barrel throughout the cooling zone of the extruder is cooled by circulation of suitable cooling fluids through the temperature control jacket surrounding this portion of the extruder barrel. The cooling zone of the extruder functions to reduce the temperature of the molten polymer-liquid blowing agent mixture to a temperature at which the material within the extruder may be extruded in the form of a suitable foam structure. Thereafter, the molten mixture is passed to a sixth zone hereinafter referred to as a die zone, through which the material is extruded as a tubular foam sheet. The tubular foam sheet is thereafter slit by a suitable knife so that the tube can be opened to a single flat sheet.

As indicated, the foregoing process is but one manner of forming foamed resin sheet material which can thereafter be treated by the present process. The foamed polymer sheet material can be wound up on to mandrels and stored as inventory prior to treatment according to the present invention or the foamed resin sheet material can be transported directly for treatment by the process of the present invention.

Referring to the drawing herein, foamed resin sheet stock material 10 from a suitable source, is transported to carbon dioxide treating chamber 12 by passing the same around rollers 14 calculated to give sheet 10 a deviated route within chamber 12. This deviated route, plus the rate of transport, will provide the appropriate residence time for sheet 10 so that optimum accelerated aging can be obtained. The interior of chamber 12 is composed of an atmosphere 16 which is at least substantially carbon dioxide. This atmosphere can be heated to a temperature within the range of from 35° to 135° C. preferably from 90°-110° C., in order to enhance the transpiration of the carbon dioxide into the foamed sheet. Thereafter, the treated foam sheet 10 is transported, in the direction of the arrow, through a preheating oven 18 wherein the polystyrene foam sheet is heated to a temperature sufficient for subsequent expansion and formation of the sheet. For polystyrene this preheating temperature is in the range of from about 100° C. to 125° C. Thereafter, the heated sheet is transported to a pair of matched forms 20 and 22 which conform to the shape of the desired product article. At this point, the preheated polystyrene sheet is drawn into the product articles desired.

While all aspects of what literally transpires during the process is not completely understood, the consequences of aging or not aging is known. If freshly foamed polystyrene is thermoformed without aging, not only will the foam tend to sag during formation, but the increase in sheet gage or "blow-up" will be comparatively small after pre-heating and thermoformation. If the foam sheet is aged for say from 24 to 36 hours before thermoformation, then the sheet will resist sagging, and a "blow-up" of up to 100% and more can be expected. It is believed that during this aging period, atmospheric gases, principally oxygen and nitrogen, diffuse or transpire into the foamed polystyrene. This results in an increased internal pressure. At subsequent preheating, prior to thermoforming, the foam, in its softened condition, can yield to the internal pressure and the gauge of the sheet increases giving more sheet bulk. By the present invention the same effect is accomplished but a the fraction of the normal aging time. The carbon dioxide treatment can last for as long a period of time as is practical. Periods of time ranging from about 0.5 to about 10 minutes are preferred. It is also understood that the chamber 12 can be pressurized with the carbon dioxide to the equivalent of up to several atmospheres in order to enhance the efficacy of the artificial aging. It is also understood that the so-aged foamed resin need not be immediately transported to a thermoforming operation, but can be inventoried and later utilized as the need dictates. For short term inventory purposes, the storing should be in a $CO_2$ atmosphere.

While a mixture of sodium bicarbonate and citric acid has been disclosed as a useful nucleating agent, it is to be understood that others may also be employed and are contemplated. The blowing agents contemplated for use in the present invention include all known blowing agents, but particularly preferred are low molecular weight aliphatic hydrocarbons, for example, the $C_1$–$C_{10}$ hydrocarbons, for example, methane, ethane, propane, butane, n-pentane, isopentane, hexane, heptane, cyclopentadiene, etc. also preferred are the Freons, i.e. chloro-fluorocarbons. Mixtures of the aforesaid blowing agents or foaming agents also can be employed.

EXAMPLE

As an example of the continuously operated system according to this invention, polystyrene foam can be prepared as follows.

Polystyrene resin pellets can be admixed with a nucleating agent comprised of sodium bicarbonate and anhydrous citric acid. The nucleating agent can constitute 0.58% by weight based upon the total weight of the polystyrene being charged. The acid to bicarbonate ratio can be 1:0.76. These materials are continuously feed into a hopper of, for example, a two and one half inch diameter screw extruder having a L/D of 24:1. The extruder is operated at an extrusion rate of about 150 pounds per hour. By means of extruder barrel heaters, the portion of the extruder barrel surrounding the feed zone of the extruder is maintained at a temperature of about 220° F. In the heat plasticizing zone, the pentane injection zone, and the mixing zone, the extruder barrel is maintained at a temperature of about 400° F. to 450° F. About 5% by weight of pentane, based upon the total weight of resin and nucleating agent, is injected into the polystyrene composition at a point beyond the feed zone where the polystyrene is in a molten condition. The molten mass is then passed through the extruder mixing zone and a cooling zone where it is cooled to 290°–320° F., and then extruded through an annular die orifice as a tubular foamed sheet. The tubular foam is passed about and over a mandrel designed to at least generally assist in maintaining a substantially uniform diameter within the extruded foam polymer tube. Thereafter, a knife or other cutting means cuts through one wall of the extruded tube and the same is opened to form a single wide sheet of extruded foam. This sheet is then transported through the carbon dioxide treatment chamber. The chamber is continually maintained at approximately 100% $CO_2$ atmosphere at a slightly positive pressure and at a temperature of approximately 200° F. The residence time within the chamber is approximately 10 minutes.

Thereafter, the $CO_2$ treated sheet stock is transported to an oven chamber where it is heated during the traverse therethrough to a temperature of from 210° F. to 250° F. From this pre-heating chamber the softened and gauge-increased sheet is transported to the thermoformation dies, e.g. cups, egg cartons, sandwich containers, and the selected articles are formed. On trimming away selvage, the process is complete.

The effectiveness of this carbon dioxide process will result in a gauge increase of at least 90% after completion of preheating the aged foam sheet prior to thermoformation. This degree of gauge increase is at least equivalent to that obtained when the same polystyrene sheet foam is conventionally aged at ambient for from 24–72 hours. The same sheet foam, treated in an air atmosphere for the same short period of time and temperature as the $CO_2$ treatment, will have a gauge increase of only up to about less than 20%.

It is to be understood that the carbon dioxide treatment chamber 12 or preheating oven 18 or both can be modified so that each is in effect on extension of the other. Chamber 12 can contain heating elements, as in the example, and oven 18 can contain a continuous $CO_2$ atmosphere so that maximum $CO_2$ transpiration occurs during heating in both units. The presence of the $CO_2$ also decreases any chance of fire hazard.

What is claimed is:

1. A method for treating foamed styrene polymer sheet comprising exposing said polymer sheet to an atmosphere of at least substantially carbon dioxide at a temperature sufficient to cause transpiration, absorption or dissolution of carbon dioxide into said polymer.

2. A method for decreasing the density of foamed polystyrene sheet comprising: extruding a combination of molten polystyrene and foaming agent from a region of higher pressure to a region of lower pressure to cause foaming of the polystyrene; transporting the foamed polystyrene through a confined region having an atmosphere of at least substantially carbon dioxide to thereby decrease the density of said foamed polystyrene on subsequent heating above the Tg of said resin as compared with unaged foamed resin.

3. The process of claim 2 wherein said atmosphere is at a temperature about 35° to 135° C.

4. A process for preparing rapidly aged thermoplastic resin foam sheet comprising
   (a) melting a thermoplastic resin;
   (b) introducing thereto under pressure, a foaming agent in liquid form, said agent being a member selected from the group consisting of a low molecular weight alphatic hydrocarbon, a low molecular weight halocarbon and mixtures thereof;
   (c) extruding the combination in sheet form into a lower pressure atmosphere of air to cause foaming of said resin; and transporting said foamed resin through a confined region having an atmosphere of at least substantially carbon dioxide to age said foamed resin at a rate faster than in the absence of the carbon dioxide.

5. The process of claim 4 wherein said resin is a styrene polymer.

6. The process of claim 5 wherein said polymer is a polystyrene.

7. The process of claim 5 wherein said polymer is poly-p-methylstyrene.

8. The process of claim 4 wherein a nucleating agent, in an amount effective for nucleating foam cells, is added to said resin prior to extrusion thereof.

9. The process of claim 8 wherein said nucleating agent is a mixture of citric acid and sodium bicarbonate.

10. The process of claim 4 wherein the aged, foamed polymer is thereafter thermoformed into articles without any additional aging.

11. A continuous process for preparing a thermoplastic resin foam sheet comprising:
    (a) feeding a thermoplastic resin to a screw-type extruder and heating the resin to a first temperature above the melting temperature of the resin;
    (b) introducing thereto, under pressure, a foaming agent in liquid form, while mixing the resin at said first temperature, said foaming agent being a member selected from the group consisting of a low molecular weight aliphatic hydrocarbon, a low molecular weight halocarbon and a mixture thereof;
    (c) cooling the mixture of molten resin and blowing agent to a second temperature below the first temperature and above the melting temperature;
    (d) extruding a sheet of said resin into a lower pressure atmosphere of air to cause foaming of said resin; and
    (e) transporting said foamed resin sheet through a confined region of substantially carbon dioxide to cause aging of said foamed resin at least at a rate faster than in the absence of said carbon dioxide.

12. The process of claim 11 wherein said aging on subsequent heating effects a density decrease of at least about 20%.

13. The process of claim 12 wherein said resin is a styrene polymer.

14. The process of claim 13 wherein said foaming agent is a $C_1$ to $C_{10}$ hydrocarbon or a fluorocarbon or mixtures thereof.

15. The process of claim 14 wherein said blowing agent is pentane.

16. The process of claim 15 wherein said resin is polystyrene.

17. The process of claim 15 wherein said resin is poly-p-methylstyrene.

18. The process of claim 16 wherein a nucleating agent, in an amount effective for nucleating foam cells, is added to said resin prior to extrusion thereof.

19. The process of claim 18 wherein said nucleating agent is a mixture of citric acid and sodium bicarbonate.

* * * * *